(12) United States Patent
Zheng

(10) Patent No.: US 12,055,429 B2
(45) Date of Patent: Aug. 6, 2024

(54) INTELLIGENT MEASUREMENT CUP INCLUDING LASER DETECTION UNIT ELECTRICALLY CONNECTED TO MAIN CONTROL CIRCUIT BOARD

(71) Applicant: SGUAI (SHENZHEN) INTELLIGENT TECHNOLOGY CO., LTD, ShenZhen (CN)

(72) Inventor: Liuke Zheng, ShenZhen (CN)

(73) Assignee: SGUAI (SHENZHEN) INTELLIGENT TECHNOLOGY CO., LTD (CN)

(*) Notice: Subject to any disclaimer, the term of this patent is extended or adjusted under 35 U.S.C. 154(b) by 362 days.

(21) Appl. No.: 17/629,786

(22) PCT Filed: Jun. 1, 2020

(86) PCT No.: PCT/CN2020/093742
§ 371 (c)(1),
(2) Date: Jan. 25, 2022

(87) PCT Pub. No.: WO2021/227144
PCT Pub. Date: Nov. 18, 2021

(65) Prior Publication Data
US 2022/0268617 A1    Aug. 25, 2022

(30) Foreign Application Priority Data
May 15, 2020 (CN) .......................... 202010410109.8

(51) Int. Cl.
*G01F 23/00* (2022.01)
*A47G 19/22* (2006.01)
(Continued)

(52) U.S. Cl.
CPC ....... *G01F 23/292* (2013.01); *A47G 19/2227* (2013.01); *G01F 23/0007* (2013.01); *A47G 2019/225* (2013.01)

(58) Field of Classification Search
CPC .............. G01F 23/292; G01F 23/0007; A47G 19/2227; A47G 2019/225; A47G 21/182;
(Continued)

(56) References Cited

U.S. PATENT DOCUMENTS

2019/0021528 A1*  1/2019  Bissen .................. G16H 20/60
2019/0021529 A1*  1/2019  Schucker ........... A47G 19/2227

FOREIGN PATENT DOCUMENTS

| CN | 201780061624 A | 7/2019 |
| CN | 209518675 U | * 10/2019 |
| CN | 201821994218 U | 10/2019 |

\* cited by examiner

*Primary Examiner* — Brandi N Hopkins

(57) ABSTRACT

An intelligent measurement cup comprises a cup body and a cup cover with an electronic module. The electronic module comprises a battery, a main control circuit board electrically connected to the battery, and a laser detection unit electrically connected to the main control circuit board. The laser detection unit comprises a laser probe and a transparent shielding sheet positioned to face the cup body. The cup cover has a corresponding through hole aligned with the laser probe to allow its light to pass through. The emitted laser is configured to penetrate the shielding sheet and scatter into the cup body, to thereby generate sufficient feedback photons. The spectra reflected back through different emission media are different, therefore, the conditions of a liquid, conditions comprising the remaining amount, the type, whether the liquid has deteriorated, etc., in the cup body can be accurately detected.

14 Claims, 8 Drawing Sheets

(51) Int. Cl.
*G01F 23/292* (2006.01)
*G01N 21/03* (2006.01)
*G01N 21/31* (2006.01)

(58) Field of Classification Search
CPC .............. A47G 19/221; A47G 19/2205; A47G 19/2288; G01K 1/14; Y02B 20/40; F21L 4/005; F21L 4/00; Y02E 60/10; B65D 81/3837; A61M 21/00; A61M 11/00; Y02A 50/30
See application file for complete search history.

INTELLIGENT MEASUREMENT CUP INCLUDING LASER DETECTION UNIT ELECTRICALLY CONNECTED TO MAIN CONTROL CIRCUIT BOARD

TECHNICAL FIELD OF THE INVENTION

The present invention relates to a cup, and more particularly, to an intelligent measurement cup.

BACKGROUND OF THE INVENTION

Cup is an essential article in people's daily life, such as being used for holding water, milk, coffee and other drinks. At present, there are many kinds and styles of cups on the market, but most of them only have basic functions of holding and heat preservation, and there are many inconveniences in use, such as being difficult to intuitively know a water volume and a water temperature in a cup, and being difficult to meet people's needs.

SUMMARY OF THE INVENTION

In view of this, an intelligent measurement cup capable of effectively solving the above problems is provided.

An intelligent measurement cup comprises a cup body and a cup cover covering the cup body, wherein the cup cover is internally provided with an electronic module, the electronic module comprises a battery, a main control circuit board electrically connected with the battery, and a laser detection unit electrically connected with the main control circuit board, the laser detection unit comprises a laser probe and a transparent shielding sheet covering the laser probe, the laser probe is arranged towards one side on which the cup body is located, a through hole corresponding to the laser probe is formed in the cup cover for light of the laser probe to penetrate through, and laser light emitted by the laser probe passes through the shielding sheet and then is emitted into the cup body in a scattering mode.

Compared with the prior art, the intelligent measurement cup of the present invention utilizes a scattering effect of the transparent shielding sheet on the light of the laser probe to enable the light to be emitted into the cup body in the scattering mode, sufficient feedback photons are ensured to be formed, and spectra reflected by different emitting media are different, so that conditions of a liquid in the cup body can be accurately detected, comprising an allowance, a type, whether the liquid goes bad or not, and the like.

DETAILED DESCRIPTION OF THE INVENTION

In order to facilitate the understanding of the present invention, the present invention will be described more comprehensively hereinafter with reference to the relevant accompanying drawings. One or more embodiments of the present invention are exemplarily given in the accompanying drawings, so as to enable the technical solutions disclosed in the present invention to be understood more accurate and thorough. However, it should be understood that the present invention may be implemented in many different forms, and is not limited to the embodiments described hereinafter.

Figure 1:
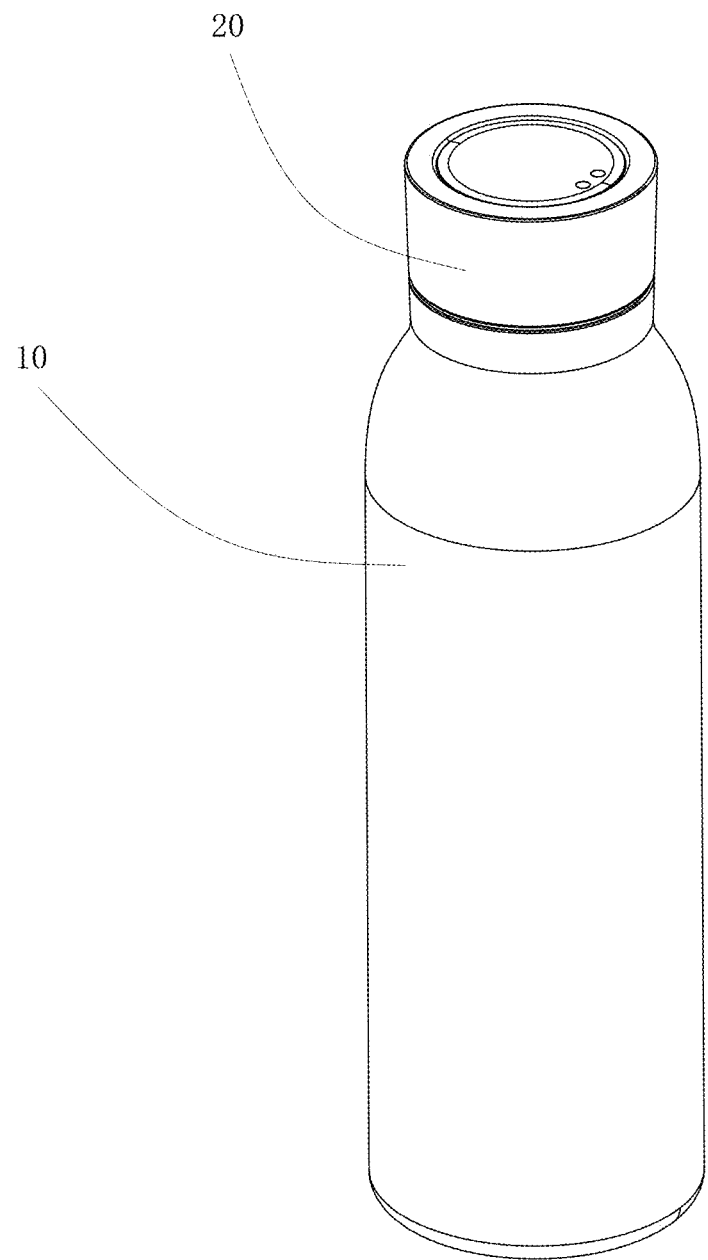
FIG. 1 is a stereoscopic assembly diagram of an intelligent measurement cup according to an embodiment of the present invention.
Figure 2:
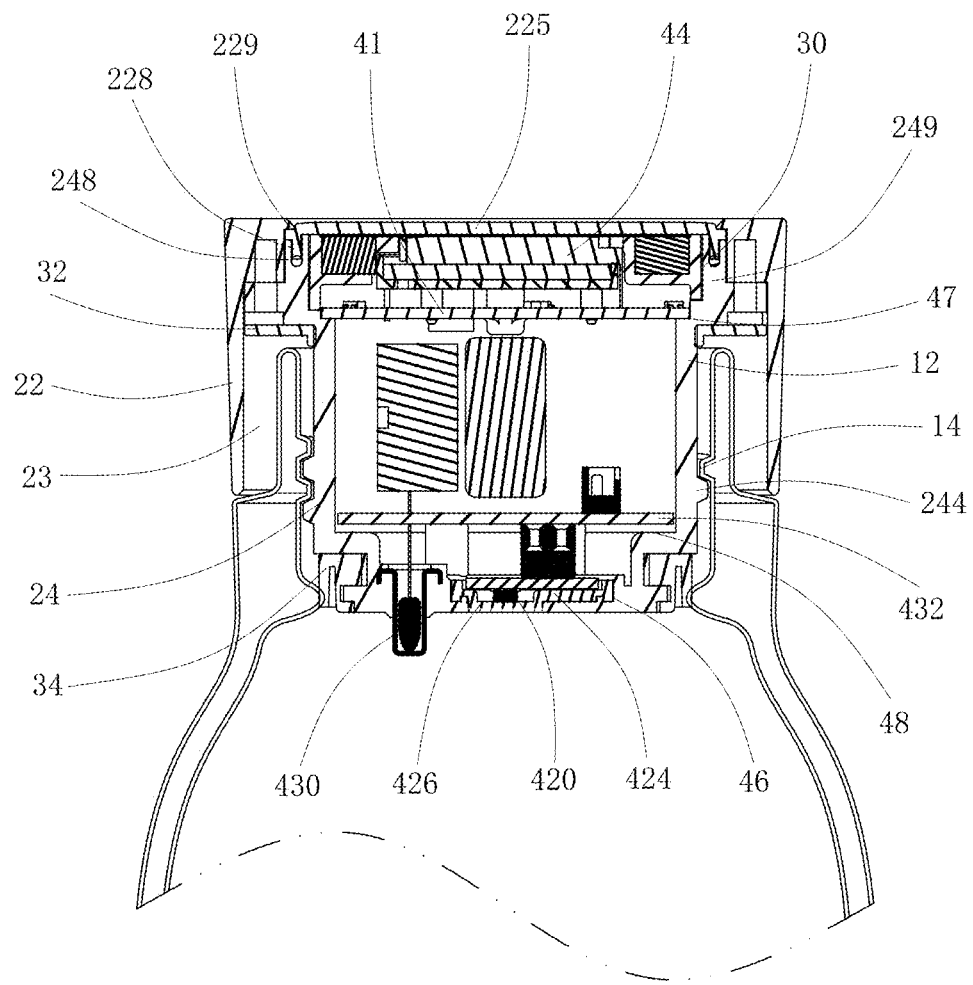
FIG. 2 is a cross-section view of the intelligent measurement cup shown in FIG. 1.
Figure 3:
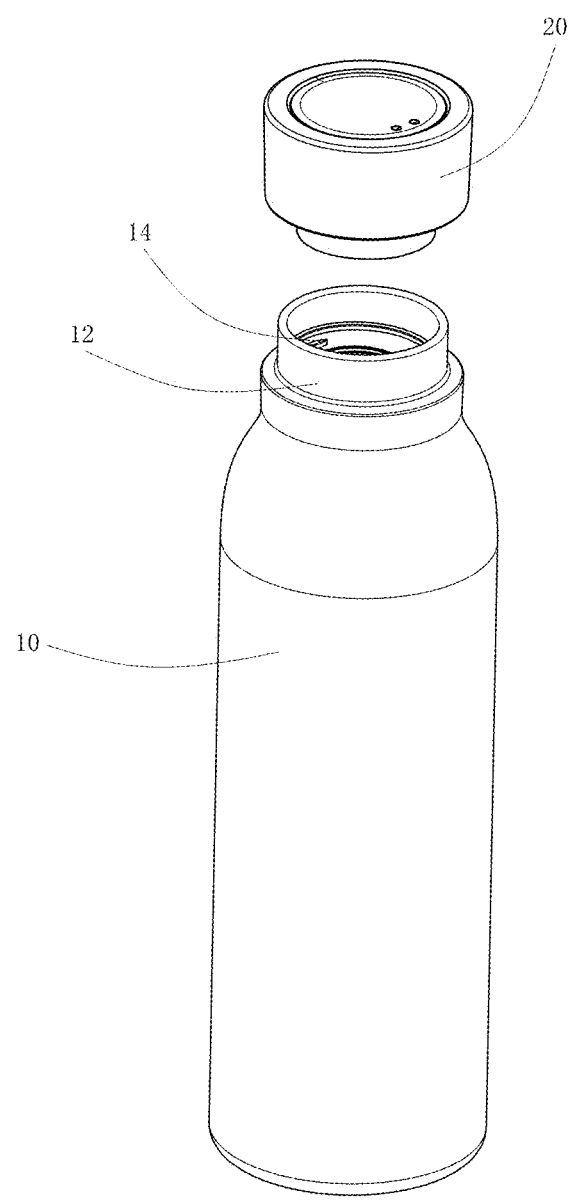
FIG. 3 is an exploded view of the intelligent measurement cup shown in FIG. 1.

As shown in FIG. 1 to FIG. 3, an intelligent measurement cup of the present invention comprises a cup body 10 and a cup cover 20 detachably connected with the cup body 10.

The cup body 10 is cylindrical, and a space is formed in the cup body for holding objects, especially liquid drinks such as water, milk and fruit juice. A top portion of the cup body 10 is shrunk to form a connecting portion 12 with a smaller caliber for being connected with the cup cover 20. In the embodiment, a screw thread 14 is formed on an inner surface of the connecting portion 12, and screwed with the cup body 10. Preferably, the cup body 10 has a heat insulation structure, which has a good heat preservation effect on the liquid in the cup for a certain period of time. In the embodiment, the cup body 10 has an inner and outer double layer heat insulation structure, a gap is formed between inner and outer double layers, and the gap may be vacuum or filled with a heat insulation material, which effectively reduces heat transfer from inside to outside, thus achieving a heat insulation effect. In other embodiments, a heat insulation material layer may also be formed on a wall surface of the cup body 10, so as to further reduce the heat transfer, thus achieving a heat preservation function.

Figure 4:
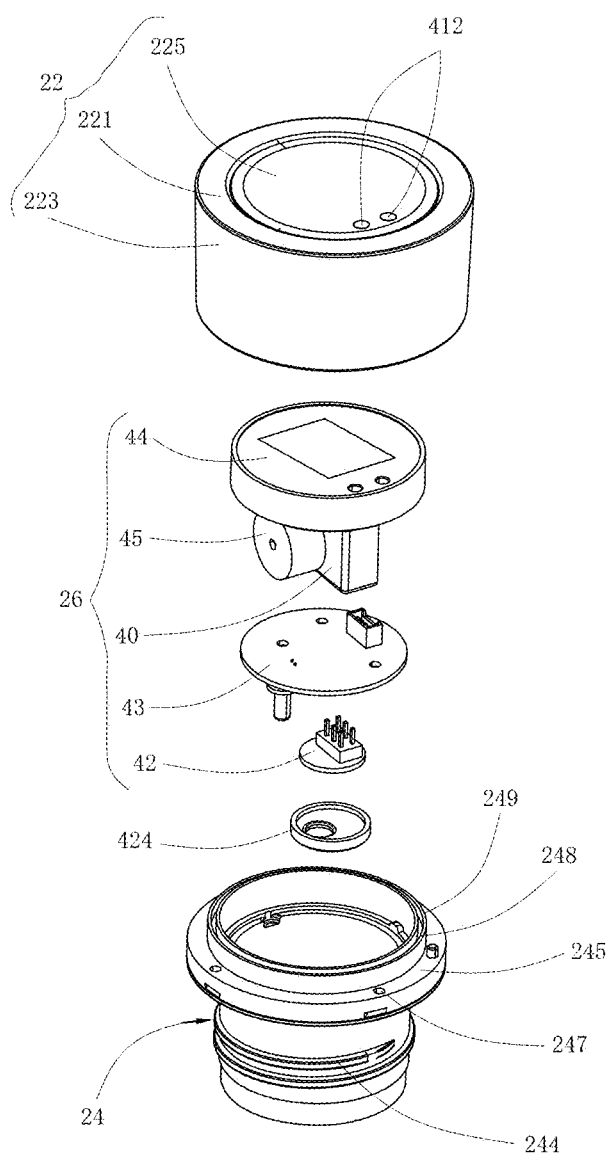
FIG. 4 is a further exploded view of the intelligent measurement cup shown in FIG. 3.
Figure 5:
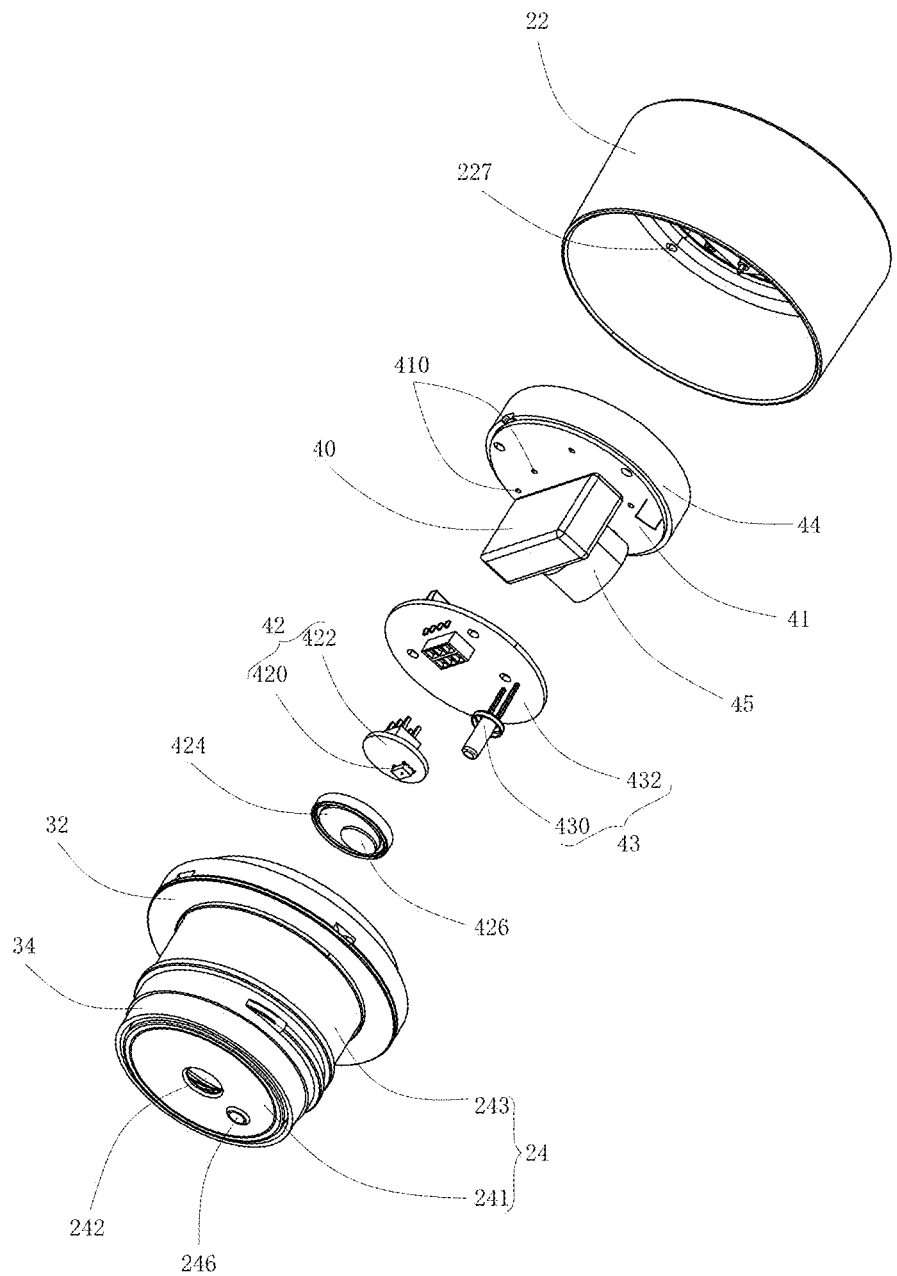
FIG. 5 is a view of another angle of FIG. 4.

With reference to FIG. 4 and FIG. 5, the cup cover 20 comprises an outer cover 22, an inner cover 24 connected in the outer cover 22, and an electronic module 26 arranged in the inner cover 24.

With reference to FIG. 2, the outer cover 22 has an inverted U-shaped cross section, and comprises a top wall 221 and a side wall 223 extending downwards from an edge of the top wall 221. The inner cover 24 has a U-shaped cross section, and comprises a bottom plate 241 and a side plate 243 extending upwards from an edge of the bottom plate 241. An outer diameter of the side plate 243 of the inner cover 24 is smaller than an inner diameter of the side wall 223 of the outer cover 22, and a gap 23 is formed between the side plate and the side wall in a radial direction. A top portion of the side plate 243 extends outwards in a radial direction to form an annular fixing portion 245, and the annular fixing portion 245 is overlapped below the top wall 221 of the outer cover 22 and fixedly connected with the top wall of the outer cover. In the embodiment, corresponding fixing holes 247 and 227 are formed in edges of the fixing portion 245 and the top wall 221, and fixing members such as screws penetrate into the fixing holes 247 and 227 to fixedly connect the inner cover 24 in the outer cover 22. An opening is formed in a center of the outer cover 22, a lens 225 is arranged at the opening, and the lens 225 is directly oriented to the electronic module 26 in the inner cover 24, which is convenient for a user to read relevant information displayed by the electronic module 26.

In the embodiment, an inner edge of the fixing portion 245 of the inner cover 24 extends upwards to form an annular lower positioning portion 249, and the lower positioning portion 249 is inserted into the opening of the outer cover 22 and abuts against a lower side of the lens 225. An inner edge of the top wall 221 of the outer cover 22 extends inwards in a radial direction to form an annular upper positioning portion 229, and the upper positioning portion 229 abuts against an upper side of the lens 225. Therefore, the lens 225 is clamped between the inner cover 24 and the outer cover 22 through the upper and lower positioning portions 229 and 249. Preferably, an edge of the lens 225 protrudes downwards to form a ring flange 228, a ring groove 248 is formed on the positioning portion 249 of the inner cover 24, and the ring flange 228 of the lens 225 is connected into the ring groove 248 to form preliminary positioning. More preferably, the ring groove 248 is internally provided with a sealing ring 30, which forms a sealed connection between the lens 225 and the inner cover 24. In other embodiments, the ring flange 228 may also be formed on the inner cover 24, and correspondingly, the ring groove 248 may also be formed on the lens 225.

When the cup cover 20 is connected with the cup body 10, the outer cover 22 is covered on the connecting portion 12 of the cup body 10 and the inner cover 24 is inserted into the connecting portion 12. At the moment, the connecting portion 12 is inserted into the gap 23 between the side plate 243 and the side wall 223. A screw thread 244 is formed on an outer surface of the side plate 243, and the screw thread 244 is matched with the screw thread 14 at the connecting portion 12 of the cup body 10. After the inner cover 24 is inserted in the connecting portion 12 of the cup body 10, the inner cover 24 may be screwed on the cup body 10 by rotating (usually in a clockwise direction) the cup cover 20. When the cup cover 20 needs to be removed, only the cup cover 20 is rotated in an opposite direction. Preferably, the top portion and the bottom portion of the side plate 243 are sleeved with sealing members 32 and 34 respectively. After assembly, the sealing member 32 at the top portion of the side plate 243 is sandwiched between the side plate 243 and the side wall 223 and the sealing member 34 at the bottom portion is sandwiched between the side plate 243 and the connecting portion 12, so that sealed connections are formed between the outer cover 22 and the inner cover 24 and between the inner cover 24 and the cup body 10, thus avoiding leakage caused by shaking and toppling of the cup.

The electronic module 26 comprises a battery 40, a main control circuit board 41 connected with the battery 40, and a plurality of functional units connected with the main control circuit board 41, such as a laser detection unit 42, a temperature detection unit 43, a display unit 44 and a voice unit 45.

The battery 40 serves as a power supply for the whole cup, and is preferably a rechargeable battery. The main control circuit board 41 is configured for receiving data of the detection units 42 and 43 and informing the user by voice and/or text, such as broadcasting to the user through the voice unit 45, or displaying to the user through the display unit 44. A charging circuit connected with the battery 40 and charging pins 410 for being connected with an external power supply are formed on the main control circuit board 41. In the embodiment, magnets 412 are embedded in the top wall 221 of the cup cover 20, and the magnets 412 are connected with the charging pins 410 in one-to-one correspondence to form charging heads of the cup of the present invention. When the battery 40 needs to be charged, the battery is matched with the external magnetic charging heads, which means that a magnetic anti-misplug charging structure is formed, thus being convenient and fast. Preferably, the main control circuit board 41 is also provided with a Bluetooth module, which may perform wireless data transmission with other electronic devices, such as a mobile phone and a tablet computer.

The laser detection unit 42 comprises a laser probe 420 and a first circuit board 422 electrically connected with the laser probe 420.

The laser probe 420 is arranged towards the cup body 10, and a through hole 242 directly oriented to the laser probe 420 is correspondingly formed in a center of the bottom plate 241 of the inner cover 24. Preferably, a shielding sheet 424 is covered below the laser probe 420, which has a scattering effect on light emitted by the laser probe. In the embodiment, a mounting base 46 is also formed on the bottom plate 241 of the inner cover 24, and the mounting base 46 is arranged around the through hole 242 for fixing the laser detection unit 42. The shielding sheet 424 is made of a transparent material, is located at one side of the first circuit board 422 oriented to the cup body 10, and covers the laser probe 420. The laser probe 420 is arranged corresponding to a position of the through hole 242, and a part of the shielding sheet 424 corresponding to the laser probe 420 protrudes into the through hole 242 to form a cover-like shielding portion 426. Preferably, the shielding portion 426 is closely matched with the through hole 242 to close the through hole 242, which may isolate the electronic module 26.

When in use, the laser probe 420 emits laser light towards the cup body 10 and receives feedback photons, scattering may be formed when the emitted laser light encounters the shielding portion 426, and a single emission direction of the laser light is changed, so that the laser light can be divergently emitted into the cup body 10. Therefore, there can be more feedback photons, and spectra reflected by different emitting media are different. Therefore, the first circuit board 422 calculates, analyzes and judges a liquid level in the cup body 10 and composition of the liquid in the cup body 10 according to the feedback photons of the laser probe 420. For example, in a specific embodiment, the first circuit board 422 is integrated with a micro spectrum sensor chip AS7341, and the AS7341 is an 11-channel device, wherein 8 channels cover 8 equidistant parts in a visible spectrum, and there are also a near-infrared light channel, a pure channel and a channel dedicated to detecting typical ambient light flicker, so that a spectral characteristic of a light source or a reflective surface can be measured very accurately.

Due to arrangement of the shielding portion 426, the light is divergently emitted into the cup body 10, so that the laser detection unit 42 has enough feedback photons to accurately judge conditions of the liquid in the cup body 10. For example, the height of the liquid in the cup body 10 may be calculated according to a distance of the feedback photons, which means that an allowance of the liquid in the cup body 10 may be calculated. Alternatively, according to the spectrum of the feedback photons, the composition of the liquid in the cup body 10 may be analyzed to judge which liquid it is and whether the liquid goes bad or not. In addition, if there is dirt on the shielding sheet 424, when the dirt does not completely cover the shielding sheet 424, a certain amount of laser light may still be divergently emitted into the cup body 10 after being scattered by the shielding sheet 424, thus ensuring an accuracy of measurement. However, when the dirt completely covers the shielding sheet 424, the laser light turns back at the shielding sheet 424, and at the moment, the reflection distance of the laser photons is very short, so that whether the shielding sheet 424 needs to be cleaned may be judged by a reflection stroke of the laser light.

The temperature detection unit 43 comprises a temperature probe 430 and a second circuit board 432 connected with the temperature probe 430. The temperature probe 430 is arranged towards an inside of the cup body 10, and correspondingly, a through hole 246 is formed in the bottom plate 241 of the inner cover 24 for the temperature probe 430 to penetrate through. When in use, the temperature probe 430 senses a temperature in the cup body 10 and feeds back a result to the second circuit board 432 for processing. In the embodiment, a first step 47 and a second step 48 are formed on an inner surface of the side plate 243 of the inner cover 24. The first step 47 is formed at a top end of the side plate 243 for fixing the main control circuit board 41. The second step 48 is close to a bottom end of the side plate 243 for fixing the second circuit board 432. The main control circuit board 41 may be electrically connected with the first and second circuit boards 422 and 432 through a connector and a leading wire, and according to detection results of the temperature detection unit 43 and the laser detection unit 42, the display unit 44 and the voice unit 45 are controlled to output corresponding information.

The display unit 44 is arranged towards the lens 225 of the outer cover 22, and directly displays the detection results, such as the allowance of the liquid, the composition of the liquid and the temperature of the liquid, to the user by the text under an action of the main control circuit board 41. Certainly, the display unit 44 may also display other information, such as date and time. The voice unit 45 may be a sound pickup such as a loudspeaker, or a sound generator such as a speaker and a buzzer, which informs the user of the detection results by voice or warning under the action of the main control circuit board 41, such as informing of the type, the temperature and the allowance of the liquid in the cup body 10 by voice; or when the shielding sheet 424 needs to be cleaned, an alarm is given to remind the user to clean, or when the liquid in the cup body 10 goes bad, an alarm is given to remind the user not to drink. Certainly, the voice unit 45 may also broadcast or warn of other information, such as on-time alarm and charging warning, or may also receive an external voice instruction.

In the embodiment, the voice unit 45 and the battery 40 are arranged between the main control circuit board 41 and the second circuit board 432, and the space in the inner cover 24 is reasonably utilized. Preferably, the cup cover 20 is provided with a sound outlet hole for the voice unit 45 to output voice. The display unit 44 is located above the main control circuit board 41, and directly oriented to the lens 225 of the outer cover 22. The charging pins 410 penetrate through a housing base of the display unit 44 and are connected with the magnets 412. On the whole, the units of the electronic module 26 are reasonably arranged in the inner cover 24, so as to ensure that the functional units may not conflict with each other, and also facilitate routing and connection between the functional units.

Figure 6:
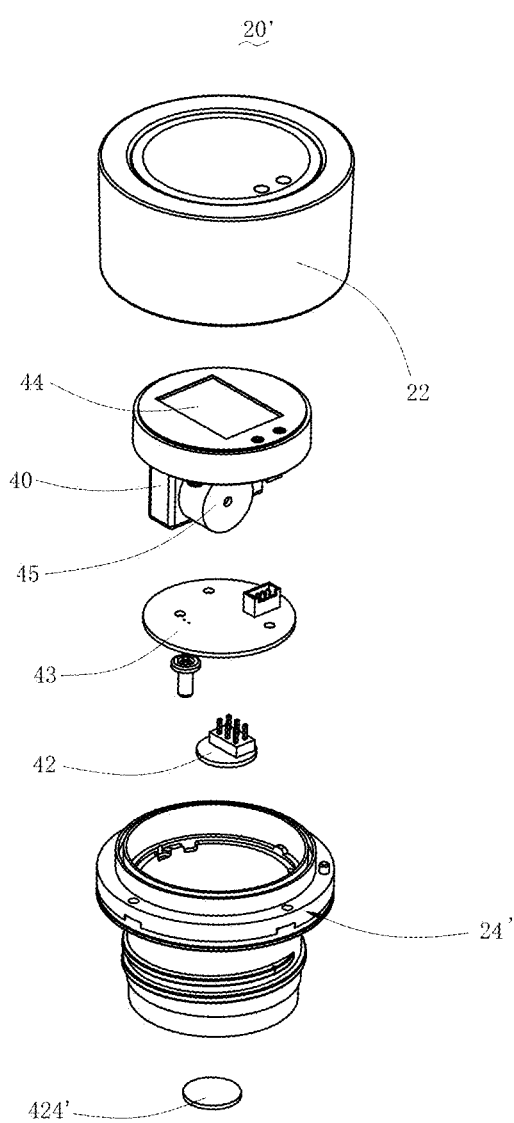
FIG. 6 is an exploded view of a cup cover of the intelligent measurement cup according to another embodiment of the present invention.
Figure 7:
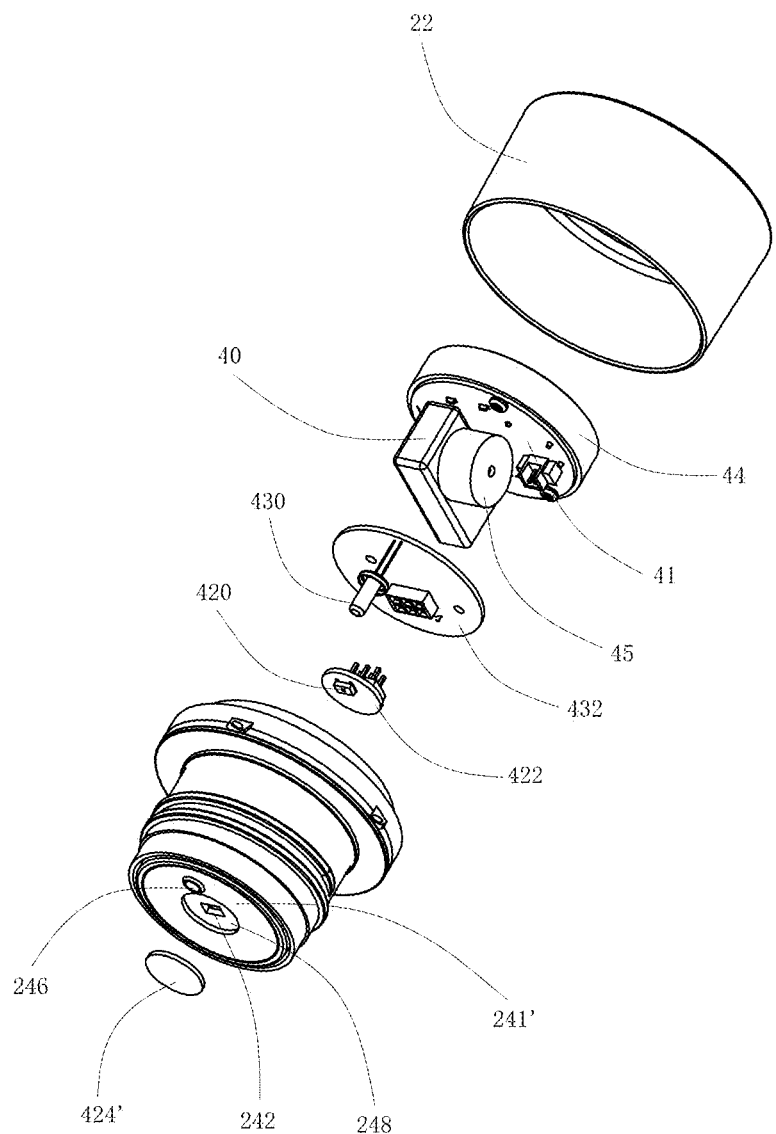
FIG. 7 is a view of another angle of FIG. 6.
Figure 8:
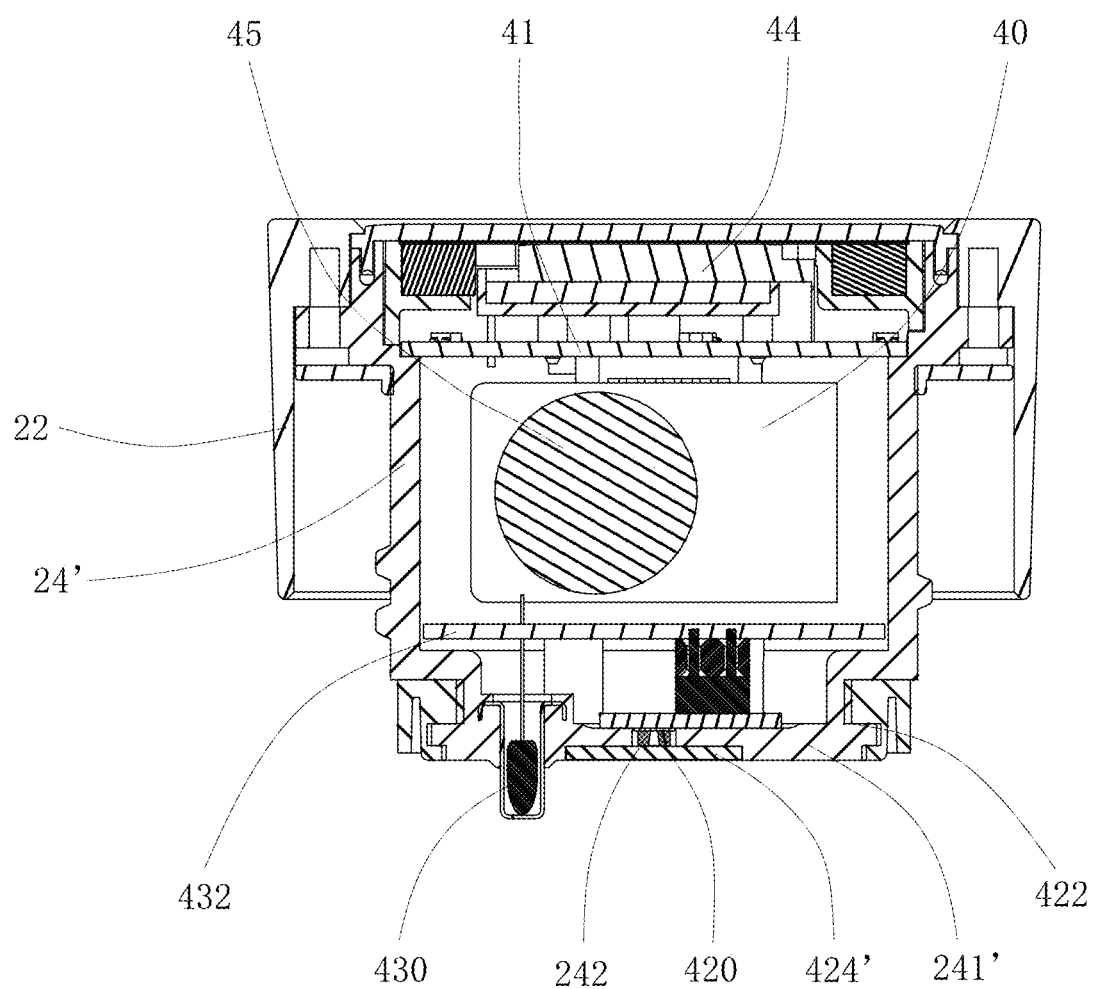
FIG. 8 is a cross-section view of the cup cover shown in FIG. 6.

FIG. 6 to FIG. 8 show a cup cover 20' of the intelligent measurement cup according to another embodiment of the present invention, which is mainly different from that of the previous embodiment in a shielding sheet 424'. In the embodiment, the laser probe 420 is accommodated in the inner cover 24', and the shielding sheet 424' is arranged at one side of a bottom plate 241' of the inner cover 24' oriented to the cup body 10. The through hole 242 corresponding to the laser probe 420 is formed in a center of the bottom plate 241', and the groove 248 surrounding the through hole 242 is formed at one side of the bottom plate 241' oriented to the cup body 10. The shielding sheet 424' is a flat circular sheet, which is embedded in the groove 248 and covers the laser probe 420 at the through hole 242. Preferably, an edge of the shielding sheet 424' and the bottom plate 241' are integrally connected by ultrasonic welding. In some embodiments, the shielding sheet 424' may be partially painted black to reduce light transmission. Similarly, the shielding sheet 424' has a scattering effect on the laser light emitted by the laser probe 420, and enough feedback photons are formed, so as to accurately judge the conditions of the liquid in the cup body 10, comprising the allowance of the liquid, the type of the liquid, and whether the liquid goes bad or not.

It should be noted that the present invention is not limited to the above implementations, other changes may also be made by those skilled in the art according to the creative spirit of the present invention, and the changes made according to the creative spirit of the present invention should all be included in the scope of protection the present invention.

What is claimed is:

1. An intelligent measurement cup, comprising a cup body and a cup cover covering the cup body, wherein the cup cover is internally provided with an electronic module, the electronic module comprises a battery, a main control circuit board electrically connected with the battery, and a laser detection unit electrically connected with the main control circuit board, the laser detection unit comprises a laser probe and a transparent shielding sheet covering the laser probe, the laser probe is arranged towards one side on which the cup body is located, a through hole corresponding to the laser probe is formed in the cup cover for light of the laser probe to penetrate through, and laser light emitted by the laser probe passes through the shielding sheet and then is emitted into the cup body in a scattering mode.

2. The intelligent measurement cup according to claim 1, further comprising a temperature detection unit connected with the main control circuit board, wherein the temperature detection unit comprises a temperature probe, and the temperature probe penetrates through the cup cover and extends into the cup body.

3. The intelligent measurement cup according to claim 1, wherein the battery is a rechargeable battery, charging pins for being connected with an external power supply are formed on the main control circuit board, magnets are embedded in the cup cover, and the magnets are connected with the charging pins.

4. The intelligent measurement cup according to claim 1, further comprising a display unit connected with the main control circuit board, wherein a lens directly oriented to the display unit is formed on a top portion of the cup cover.

5. The intelligent measurement cup according to claim 1, further comprising a voice unit connected with the main control circuit board, wherein the voice unit is a sound pickup or a sound generator.

6. The intelligent measurement cup according to claim 1, wherein the cup cover comprises an outer cover and an inner cover connected in the outer cover, the electronic module is arranged in the inner cover, the inner cover comprises a bottom plate and a side plate extending upwards from an edge of the bottom plate, the through hole corresponding to the laser probe is formed in the bottom plate, and the shielding sheet is arranged corresponding to the through hole and covers the laser probe.

7. The intelligent measurement cup according to claim 6, wherein the shielding sheet is arranged at one side of the bottom plate facing away from the cup body, the shielding sheet comprises a shielding portion protruding into the through hole, and the shielding portion covers the laser probe.

8. The intelligent measurement cup according to claim 6, wherein the shielding sheet is arranged at one side of the bottom plate oriented to the cup body, and a groove is formed at one side of the bottom plate oriented to the cup body to accommodate the shielding sheet.

9. The intelligent measurement cup according to claim 6, wherein the outer cover comprises a top wall and a side wall extending downwards from an edge of the top wall, the side wall surrounds the side plate and a gap is formed between the side wall and the side plate to be connected with the cup body, and the side plate is inserted into the cup body and screwed with the cup body.

10. The intelligent measurement cup according to claim 9, wherein an opening is formed in a center of the top wall, the lens is arranged at the opening, an inner edge of the top wall protrudes inwards in a radial direction to form an upper positioning portion, the top portion of the side plate protrudes into the opening to form a lower positioning portion, the lens is clamped between the upper positioning portion and the lower positioning portion, a ring groove is formed on one of the lens and the lower positioning portion and a ring flange is formed on the other, and the ring flange is connected into the ring groove.

11. The intelligent measurement cup according to claim 2, wherein the cup cover comprises an outer cover and an inner cover connected in the outer cover, the electronic module is arranged in the inner cover, the inner cover comprises a bottom plate and a side plate extending upwards from an edge of the bottom plate, the through hole corresponding to the laser probe is formed in the bottom plate, and the shielding sheet is arranged corresponding to the through hole and covers the laser probe.

12. The intelligent measurement cup according to claim 3, wherein the cup cover comprises an outer cover and an inner cover connected in the outer cover, the electronic module is arranged in the inner cover, the inner cover comprises a bottom plate and a side plate extending upwards from an edge of the bottom plate, the through hole corresponding to the laser probe is formed in the bottom plate, and the shielding sheet is arranged corresponding to the through hole and covers the laser probe.

13. The intelligent measurement cup according to claim 4, wherein the cup cover comprises an outer cover and an inner cover connected in the outer cover, the electronic module is arranged in the inner cover, the inner cover comprises a bottom plate and a side plate extending upwards from an edge of the bottom plate, the through hole corresponding to the laser probe is formed in the bottom plate, and the shielding sheet is arranged corresponding to the through hole and covers the laser probe.

14. The intelligent measurement cup according to claim 5, wherein the cup cover comprises an outer cover and an inner cover connected in the outer cover, the electronic module is arranged in the inner cover, the inner cover comprises a bottom plate and a side plate extending upwards from an edge of the bottom plate, the through hole corresponding to the laser probe is formed in the bottom plate, and the shielding sheet is arranged corresponding to the through hole and covers the laser probe.

\* \* \* \* \*